March 22, 1955 R. H. COLVIN 2,704,645
AIRCRAFT BODY WITH ENCIRCLING GAS TURBINE JET ENGINE
Filed Dec. 1, 1952 2 Sheets-Sheet 1

INVENTOR
RICHARD H. COLVIN
BY Bailey, Stephens & Huettig
ATTORNEYS

March 22, 1955     R. H. COLVIN     2,704,645
AIRCRAFT BODY WITH ENCIRCLING GAS TURBINE JET ENGINE
Filed Dec. 1, 1952     2 Sheets-Sheet 2

INVENTOR
RICHARD H. COLVIN
BY Bailey, Stephens & Huettig
ATTORNEYS

United States Patent Office 2,704,645
Patented Mar. 22, 1955

2,704,645

AIRCRAFT BODY WITH ENCIRCLING GAS TURBINE JET ENGINE

Richard H. Colvin, Vancouver, British Columbia, Canada

Application December 1, 1952, Serial No. 323,447

Claims priority, application Canada December 7, 1951

9 Claims. (Cl. 244—74)

This invention is concerned with a gas turbine jet engine. More particularly the invention relates to a gas turbine jet engine having an annular compressor, an annular turbine, and an annular or annularly arranged combustion chamber or chambers, and being capable or operating at extremely high speeds.

It has long been appreciated that the higher the operating speed of the compressor and turbine of a gas turbine engine the greater is the reduction in size and weight for a given performance. In addition an extremely high operating speed is essential where the gas turbine is used in a high velocity plane in order to develop sufficient propulsion.

Hitherto the strength of the materials available for the construction of the rotating portions of the gas turbine have formed a limitation to the operating speed. At extremely high speed the centrifugal force generated will cause distortion or rupture of the rotating portions of previously developed gas turbines.

The primary object of the present invention is to provide a means for automatically counterbalancing the centrifugal force generated by the rotating portions of the gas turbine so as to enable the gas turbine to operate at higher speeds than has previously been possible without distortion or rupture of the rotating portions. Increased operating speeds are attained in accordance with this invention by providing a cylindrical rotor with inwardly directed compressor blades and turbine blades on its interior surface. A stationary inner cylinder coaxial with the rotor carries the stator blades for the compressor and turbines and these blades project outwardly from the exterior surface of the inner cylinder. The combustion chamber is also carried by the inner cylinder. The combustion chamber is annular, or may include a series of individual combustion chambers annularly arranged. A third cylinder coaxial with the rotor and inner cylinder forms an outer cylinder, which surrounds the rotor. There is an annular space between the rotor and the outer cylinder which is filled with a gas such as air at a compression which is proportional to the speed of rotation of the rotor.

The inwardly directed force exerted by the compressed gas counterbalances a large proportion of the centrifugal force tending to rupture the shell of the rotor. In addition disposing the compressor and turbine blades of the rotor within the cylindrical shell of the rotor and not on the exterior surface of the rotor as has previously been the practice has the effect that these blades are subject to compression by the centrifugal forces arising during operation and not to elongation. Consequently far greater force will be necessary for the distortion or rupture of these blades and any slight temporary distortion which may occur will decrease the length of the blades and therefore will not be likely to cause any substantial interference with the operation of the engine.

A gas turbine embodying the principle of the present invention may be built having an annular compressor, an annular combustion chamber and an annular turbine; each of these being far larger in diameter than have previously been constructed and operating at peripheral speeds in excess of those formerly believed possible. Therefore one application of the present invention is to a gas turbine jet engine which surrounds a section of the body of the plane; thereby overcoming one of the difficulties encountered in the utilization of jet engines, namely their interference with the structure of the plane. As an extension of this feature an annular gas turbine in accordance with the present invention might be incorporated in an annular wing attached to a plane or other projectile.

Another advantage of this invention is that it enables an engine to be constructed which, due to its annular shape, can be cooled by air passing not only along the outer surface of the outer cylinder but along the inner surface of the inner cylinder; thus avoiding excessively high temperatures which might otherwise result from the high speed of operation.

In the drawings which illustrate the preferred embodiment of this invention:

Figure 1:
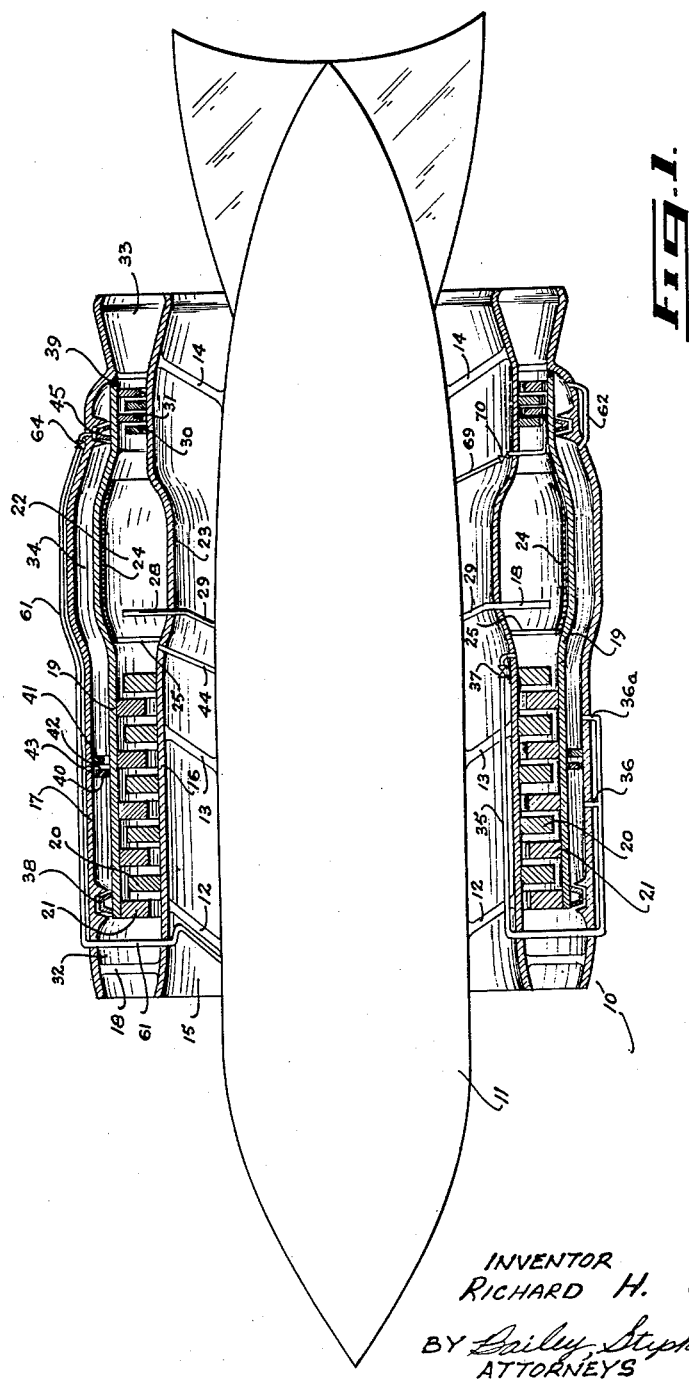
Figure 1 is a longitudinal sectional view of an aircraft fitted with an engine in accordance with this invention.

In the embodiment illustrated in Figures 1 to 4 inclusive an annular gas turbine jet engine designated generally by the numeral 10 is secured to an aircraft 11 by a plurality of sets of radial braces 12, 13 and 14. The engine encircles an intermediate portion of the aircraft, and between the engine and the aircraft there is an annular air passage 15 which cools the engine.

The engine 10 comprises a stationary inner cylinder 16 connected to a stationary outer cylinder 17 by a plurality of spaced radial braces 18. A rotating cylinder 19 lies between and is coaxial with cylinders 16 and 17.

On the outer surface of the forward portion of inner cylinder 16 are outwardly directed blades 20 which are the stator blades for the compressor. Corresponding blades 21 extending inwardly from rotating cylinder or rotor 19 mesh with blades 20 and form an annular compressor. An annular combustion chamber 22 is defined by an inwardly indented portion 23 of inner cylinder 16 and a cylinder 24 which forms the outer wall of the combustion chamber and which is joined to inner cylinder 16 by radial braces 25. The rotor 19 and the outer cylinder 17 have outwardly indented portions 26 and 27 respectively which conform to the shape of the outer wall 24 of the combustion chamber. Fuel injection nozzles 28 at the forward end of the combustion chamber are supplied by radial fuel pipes 29 which are connected to a fuel supply within the body of the aircraft. In the drawing the outer wall of the combustion chamber is shown as being close to the surface of rotor 19. However if desired a narrow air space can be left, which allows a small amount of air to escape from the compressor outside of the rotor to provide a cooling effect.

On the outer surface of the rear portion of inner cylinder 16 are outwardly directed blades 30 which are the stator blades for the turbine. Corresponding blades 31 extending inwardly from rotor 19 mesh with blades 30 and form an annular turbine.

At the forward end of the engine there is an annular air inlet 32 leading to the compressor. The air passes through the compressor, combustion chamber and turbine and then into an annular flared discharge nozzle or exhaust jet 33. Between rotor 19 and outer cylinder 17 there is an annular air space 34 which extends substantially the full length of the rotor. This space is filled with compressed gas or air. A convenient means for supplying compressed air to air space 34 is by means of a take off line 35 which passes through the wall of inner cylinder 16 between the compressor and the combustion chamber, crosses the air inlet and feeds air into air space 34 at points 36 and 36a. A valve 37 operable from the interior of the aircraft controls the air passing through line 35. At each end of air space 34 an air seal is provided. In the preferred embodiment illustrated an oil seal 38 of the type described hereunder in detail provides the air seal at the forward end. At the rear end another oil seal or other type of air seal 39 may be used. The employment of a take off from a point between the compressor and the combustion chamber to supply compressed air to air space 34 has the advantage that as the speed of rotation of the rotor rises there will be increased compression and therefore there will automatically be an increase in the counterbalancing air pressure against the outer surface of the rotor. The quantity of air taken for this purpose will have a negligible effect on the operation of the engine.

Within air space 34 are an annular fin 40 on the exterior surface of the rotor and rearwardly disposed with respect to fin 40 an annular flange 41 inwardly directed from the interior surface of the outer cylinder 17. Between fin 40 and flange 41 is a small annular space 42. Fin 40 is substantially in air sealing relationship with outer cylinder 17 and flange 41 is substantially in air sealing relationship with rotor 19. The forward pressure on flange 41 and the rearward pressure on fin 40 resulting from the compressed air within air space 34 tends to urge the rotor rearwardly with respect to outer cylinder 17 and this counteracts the natural forward pressure of the rotor. A small outlet port 43 prevents any equalization of the air pressure in spaces 42 and 34 due to leakage. The entrances 36 and 36(a) from line 35 are disposed on either side of members 40 and 41 to provide air pressure throughout the length of the rotor.

Figure 4:
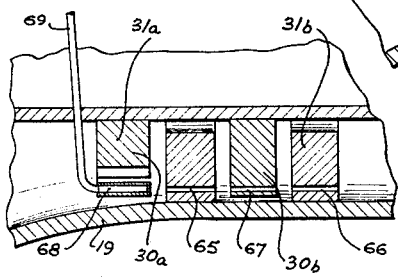
Figure 4 is a detail view of part of Figure 1.

The motor may be started by means of a small quantity of highly compressed air retained in a reservoir in the body of the aircraft and released to the combustion chamber through a number of pipes 44. In addition the means described more particularly with reference to Figure 4 are relied upon for starting the engine.

Figure 2:
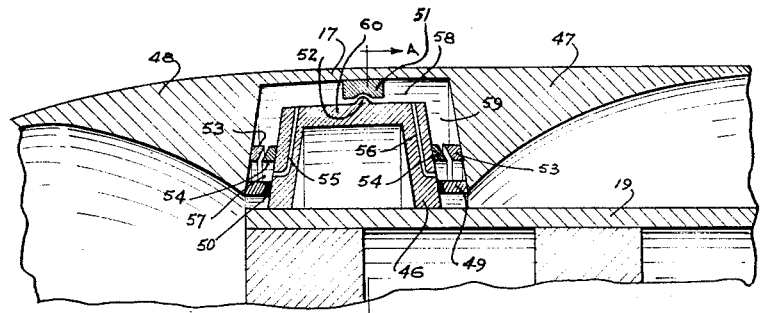
Figure 2 is a detail view of part of Figure 1.
Figure 3:
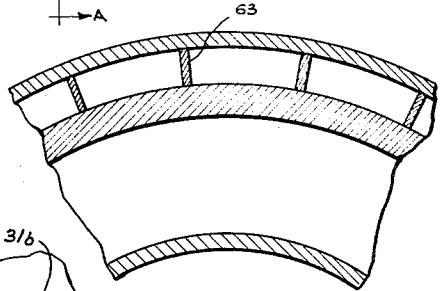
Figure 3 is a partial cross-sectional view on the line A—A in Figure 2.

The forward oil seal 38 which has already been referred to and the rear oil seal 45 are shown in detail in Figures 2 and 3. It will be seen that an annular ring 46 is attached to or forms part of rotor 19, and this ring is flanked by inwardly directed flanges 47 and 48 which are secured to or form part of outer cylinder 17. Ring 46 is preferably hollow as shown to save excess weight. Between ring 46 and the wall of cylinder 17 and between the ring and flanges 47 and 48 is an oil space within which oil is contained by means of oil seals 49 and 50.

An annular flange 51 with a V-shaped trough is centrally located between flanges 47 and 48 and defines with a corresponding V-shaped portion 52 of ring 46 a channel for the free passage of oil under normal conditions. Similarly a channel is defined between flanges 53 disposed on the inner portion of flange 47 and an opposed flange 54 which is attached to or forms part of ring 46. Within ring 46 there are a plurality of radial passages 55 and 56. Passages 55 are linked between the oil space 57 enclosed between flange 51 and oil seal 50 and the main oil spaces 58. When oil is flowing freely through the channels between flange 51 and 52, and flanges 53 and 54, the oil pressure in oil spaces 57 and 59 will be substantially equal to the oil pressure in space 58. However, if there is movement of the rotor with respect to outer cylinder 17 such as would result from swinging the aircraft the oil channels between 51 and 52, and 53 and 54 will be closed off on one side of the aircraft and the channels will be enlarged on the other side. When these channels are closed off there will be a build up of pressure in the main oil spaces 58 due to the centrifugal force of the oil in passages 55 and 56 which will result in a pressure against the outer surface 60 of ring 46. This will tend to restore equilibrium until a balanced flow through the channels occurs. When a condition of equilibrium has been attained there will merely be a circulation of oil through the passages and channels and no localized build up of pressure.

By disposing flange 51 centrally between flanges 47 and 48 the oil pressure within space 58 will tend to correct the forward pressure on one side of the aircraft, consequent upon swinging the aircraft. An oil feed line 61 may be connected to an oil pump within the aircraft to restore losses of oil or to supply a constant oil pressure, a one way valve 64 being provided in the oil feed line to prevent loss of localized pressure. If an oil seal is disposed at an intermediate portion of air passages 34 as is the case with oil seal 45 a connecting air passage 62 may be provided to equalize the air pressure on either side of the oil seal. Radial longitudinally extending fins 63 prevent swirling of the oil within oil space 58 and prevent the release of localized pressure. Fins are also provided in oil spaces 57 and 59.

In Figure 1 and in greater detail in Figure 4 a starting means is illustrated which is auxiliary to the supplying of compressed air to the combustion chamber through pipe 44. This starting means also has the advantage of cooling the blades of the rotors of the turbine during operation. Figure 4 shows a detailed view of turbine rotor blades 31a and 31b mounted on rotor cylinder 19, and turbine stator blades 30a and 30b. Thin cylindrical members 65 and 66 which are coaxial with the rotor 19 are located close to the bases of rotor blades 31a and 31b. These cylindrical members in effect divide the rotor blades into two portions. Stator blade 30b is extended close to rotor 19 and is similarly provided with a cylindrical member 67 which is in alignment with members 65 and 66. An annular ring 68 is supported on stator 30a adjacent to rotor 19 a short distance forward of rotor blade 31a. Ring 68 is fed by a plurality of radial pipes 69 which supply compressed air from the interior of the plane to passages within ring 68 which are flared so that the mouths of these passages are extended in a direction parallel to the surface of the rotor. This air impinges that portion of rotor blade 31a which lies between member 65 and rotor 19. The air is then directed by the portion of stator blade 30b which lies beyond member 67 against the portion of rotor blade 31b which lies between member 66 and rotor 19. This gives an initial impulse in the correct direction to the rotor blades of the turbine and with the assistance of the compressed air fed into the combustion chamber through pipe 44, to give an initial compression, the engine is started. It will be appreciated that other starting means may be adopted and the means which have been described are merely by way of example. A separate compressor within the plane should be used to build up compressed air for starting.

An advantage of the construction described in the preceding paragraph is that it also provides a method of cooling the rotor blades of the turbine. When the engine is being started compressed air is fed through pipe 69 from the interior of the aircraft. During normal operation the supply of compressed air from within the aircraft is cut off and a one way air inlet valve 70 located exteriorly of the engine admits atmospheric air for cooling purposes. The air flow due to the motion of the aircraft forces air into air inlet valve 70 and the suction resulting from the rotation of the portion of rotor blade 31a which is between members 66 and 19 assists in circulating the cooling air.

Figure 5:
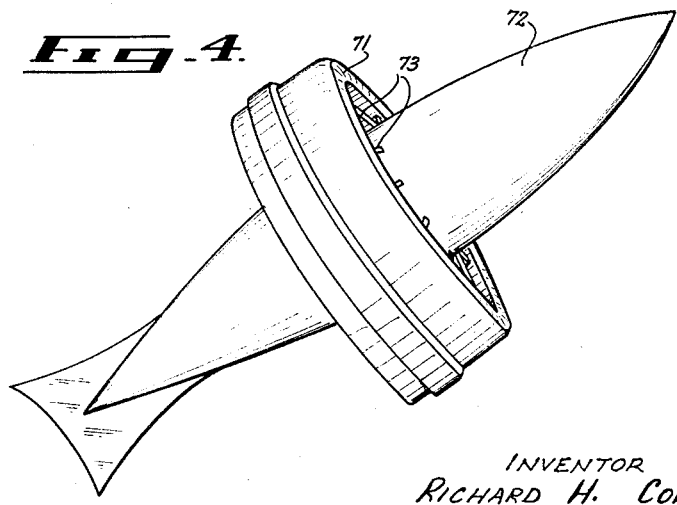
Figure 5 is a diagrammatic view illustrating the application of this invention to an aircraft with an annular wing.

Figure 5 illustrates the application of this invention to an aircraft with an annular wing. An annular wing 71 carrying within it a gas turbine in accordance with this invention encircles the aircraft body 72 and is joined thereto by struts 73.

It will be appreciated from the foregoing that a gas turbine jet engine constructed in accordance with the present invention will achieve many important advantages as stated and as apparent from the particular description.

I claim:

1. In a gas turbine jet engine having an annular compressor, an annular combustion chamber and an annular turbine, an inner stationary cylinder bearing stator blades for the compressor and the turbine on the outer surface thereof, a cylindrical rotor coaxial with said inner cylinder and having rotor blades for the compressor and the turbine on the inner surface thereof co-operating with the blades on the inner cylinder, means for retaining said rotor in coaxial relationship, a stationary outer cylinder coaxial with, spaced from, and surrounding said rotor, means for supplying compressed gas to the space between said rotor and said outer cylinder and sealing means for maintaining compression within said space.

2. In a gas turbine jet engine having an annular compressor, an annular combustion chamber and an annular turbine, an inner stationary cylinder bearing stator blades for the compressor and the turbine on the outer surface thereof, a cylindrical rotor coaxial with said inner cylinder and having rotor blades for the compressor and the turbine on the inner surface thereof co-operating with the blades on the inner cylinder, means for retaining said rotor in coaxial relationship, a stationary outer cylinder coaxial with, spaced from, and surrounding said rotor, means for supplying to the space between said rotor and said outer cylinder gas subject to a compression proportional to the speed of rotation of the rotor and sealing means for maintaining compression within said space.

3. In a turbine jet engine having an annular compressor, an annular combustion chamber and an annular turbine, an inner stationary cylinder bearing stator blades for the compressor and the turbine on the outer surface thereof, a cylindrical rotor coaxial with said inner cylinder and having rotor blades for the compressor and the turbine on the inner surface thereof co-operating with the blades on the inner cylinder, means for retaining said rotor in coaxial relationship, a stationary outer cylinder coaxial with, spaced from, and surrounding said rotor, means for supplying to the space between said rotor and said outer cylinder air subject to a compression proportional to the speed of rotation of the rotor, the last mentioned means comprising an air take off from the compressor, and sealing means for maintaining compression within said space.

4. In a gas turbine jet engine having an annular compressor, an annular combustion chamber and an annular turbine, an inner stationary cylinder bearing stator blades for the compressor and the turbine on the outer surface thereof, a cylindrical rotor coaxial with said inner cylinder and having rotor blades for the compressor and the turbine on the inner surface thereof co-operating with the blades on the inner cylinder, means for retaining said rotor in coaxial relationship, a stationary outer cylinder coaxial with, spaced from, and surrounding said rotor, means for supplying to the space between said rotor and said outer cylinder gas subject to a compression proportional to the speed of rotation of the rotor, sealing means for maintaining compression within said space and means actuated by gas pressure to exert a rearward force on the rotor to oppose the forward pressure of said rotor.

5. In a gas turbine jet engine having an annular compressor, an annular combustion chamber and an annular turbine, an inner stationary cylinder bearing stator blades for the compressor and the turbine on the outer surface thereof, a cylindrical rotor coaxial with said inner cylinder and having rotor blades for the compressor and the turbine on the inner surface thereof co-operating with the blades on the inner cylinder, means for retaining said rotor in coaxial relationship, a stationary outer cylinder coaxial with, spaced from, and surrounding said rotor, means for supplying to the space between said rotor and said outer cylinder gas subject to a compression proportional to the speed of rotation of the rotor, sealing means for maintaining compression within said space and means for exerting a rearward force on the rotor to oppose the forward pressure of said rotor comprising a flange extending inwardly from the outer cylinder within said space, a fin extending outwardly from the rotor and being forwardly disposed with respect to said flange, said fin being in air sealing relationship with the outer cylinder and said flange being in air sealing relationship with said rotor, and a low pressure space between said flange and said fin.

6. A gas turbine as in claim 5 in which an outlet port in the outer cylinder maintains low pressure in the space between the flange and the fin.

7. In a gas turbine jet engine having an annular compressor, an annular combustion chamber and an annular turbine, an inner stationary cylinder bearing stator blades for the compressor and the turbine on the outer surface thereof, a cylindrical rotor coaxial with said inner cylinder and having rotor blades for the compressor and the turbine on the inner surface thereof co-operating with the blades on the inner cylinder, means for retaining said rotor in coaxial relationship, a stationary outer cylinder coaxial with, spaced from and surrounding said rotor, means for supplying to the space between said rotor and said outer cylinder gas subject to a compression proportional to the speed of rotation of the rotor, sealing means for maintaining compression within said space and means for opposing displacement of the axis of the rotor with respect to the axis of the outer cylinder comprising an annular ring on the outer surface of the rotor, flanges inwardly directed from the outer cylinder spaced on either side of the ring and defining an oil space which extends along the sides and outer surface of the ring, oil sealing means to retain oil within said oil space, passages for the flow of oil between the ring and each of the flanges adapted to close at a point on the periphery of the cylinders which is in the direction of displacement of the axis of the rotor, radial passages on each side of said ring communicating between the inner portion of the oil space between ring and flange and the oil space between ring and outer cylinder to create an increased pressure at the point which is in the direction of displacement, and means to inhibit swirling of the oil.

8. A gas turbine as in claim 7 in which the means to inhibit swirling of the oil comprises longitudinal fins in the oil space between ring and outer cylinder and radial fins in the spaces between ring and flanges.

9. The combination of an aircraft body, a gas turbine jet engine encircling and spaced from said aircraft body, said engine having an annular compressor, a combustion chamber and an annular turbine, inwardly directed rotor blades for the compressor and turbine, outwardly directed stator blades for the compressor and turbine and means for applying gas pressure against the exterior surface of the rotor.

References Cited in the file of this patent

UNITED STATES PATENTS

| 1,827,246 | Lorenzen | Oct. 13, 1931 |
| 2,024,274 | Campini | Dec. 17, 1935 |
| 2,396,911 | Anxionnaz | Mar. 19, 1946 |
| 2,431,592 | Stalker | Nov. 25, 1947 |
| 2,515,644 | Goddard | July 18, 1950 |
| 2,596,435 | Robert | May 13, 1952 |
| 2,599,470 | Meyer | June 3, 1952 |
| 2,625,007 | Truax | Jan. 13, 1953 |

FOREIGN PATENTS

| 439,805 | Great Britain | Dec. 6, 1935 |
| 614,548 | Great Britain | Dec. 17, 1948 |